United States Patent [19]

Dieter

[11] Patent Number: 4,840,440
[45] Date of Patent: Jun. 20, 1989

[54] CORNER CONSTRUCTION APPARATUS AND METHOD

[76] Inventor: Monrow Dieter, P.O. Box 2008, Paso Robles, Calif. 93447

[21] Appl. No.: 926,449

[22] Filed: Nov. 3, 1986

Related U.S. Application Data

[63] Continuation-in-part of Ser. No. 800,468, Nov. 21, 1985, abandoned.

[51] Int. Cl.⁴ .............................................. A47F 3/00
[52] U.S. Cl. ...................................... 312/140; 52/285; 52/586; 217/65; 403/402; 403/403
[58] Field of Search ................ 312/140, 263; 403/401, 403/402, 403, 295, 205; 217/65, 69; 52/282, 285, 586

[56] References Cited

U.S. PATENT DOCUMENTS

| | | | |
|---|---|---|---|
| 157,399 | 12/1874 | Holmes | 217/69 |
| 876,617 | 1/1908 | Bierend | 312/140 |
| 1,644,910 | 10/1927 | Bohn | 312/140 X |
| 2,072,386 | 3/1937 | Smallwood . | |
| 2,079,635 | 5/1937 | Sharp | 312/140 X |
| 2,089,866 | 8/1937 | Wallentin . | |
| 2,255,151 | 9/1941 | Clements | 403/402 X |
| 2,969,268 | 1/1961 | Mason et al. | 312/140 X |
| 3,380,768 | 4/1968 | Wolfensberger . | |
| 3,381,430 | 5/1968 | Wiczer . | |
| 3,465,487 | 9/1969 | Fatosme et al. . | |
| 3,989,397 | 11/1976 | Baker | 403/205 |
| 4,035,972 | 7/1977 | Timmons . | |
| 4,261,148 | 4/1981 | Scott | 403/403 X |
| 4,385,850 | 5/1983 | Bobath | 403/403 |
| 4,477,201 | 10/1984 | Yoshiyuji | 403/403 X |
| 4,507,815 | 4/1985 | Danko | 403/402 |
| 4,509,806 | 4/1985 | Dudouyt | 312/140 X |

FOREIGN PATENT DOCUMENTS

| | | | |
|---|---|---|---|
| 975417 | 9/1975 | Canada | 312/140 |
| 981139 | 1/1976 | Canada | 312/140 |
| 1429466 | 11/1968 | Fed. Rep. of Germany | 312/140 |
| 1964770 | 7/1971 | Fed. Rep. of Germany | 312/140 |
| 996754 | 2/1983 | U.S.S.R. | 403/403 |
| 922196 | 3/1963 | United Kingdom | 312/263 |

Primary Examiner—Peter A. Aschenbrenner
Assistant Examiner—Thomas A. Rendos
Attorney, Agent, or Firm—Limbach, Limbach & Sutton

[57] ABSTRACT

A corner construction method and apparatus is disclosed including an extrusion construction for mating with and joining a pair of side panels. The extrusion includes a plurality of surface sections defined in cross-section by at least one elongate rib section, squared corners positioned at one end of the rib section, a pair of external leg sections at the other end of the rib section and a pair of internal leg sections parallel to the external leg sections and located along the rib section substantially midway between the squared corners and the external leg sections. A normal projection of each internal leg section onto the adjacent external leg sections ends substantially halfway along the length of the external leg section and apertures are provided for passing screws through the portion of the external leg section beyond that normal projection. The internal leg sections are substantially half agains as thick as the external leg sections. The facing ends of the side panels are provided with diagonal faces meeting with the opposite faces of the extrusion rib section and with squared off faces meeting with the square section. Elongate slots are provided substantially midway between the inside and outside broad surfaces of the panels for receiving the internal leg sections. The broad inside surfaces of the panels can be recessed to receive the external leg sections and attaching means within the confines of the broad side panel surfaces. Different extrusion cross-sections are illustrated.

21 Claims, 2 Drawing Sheets

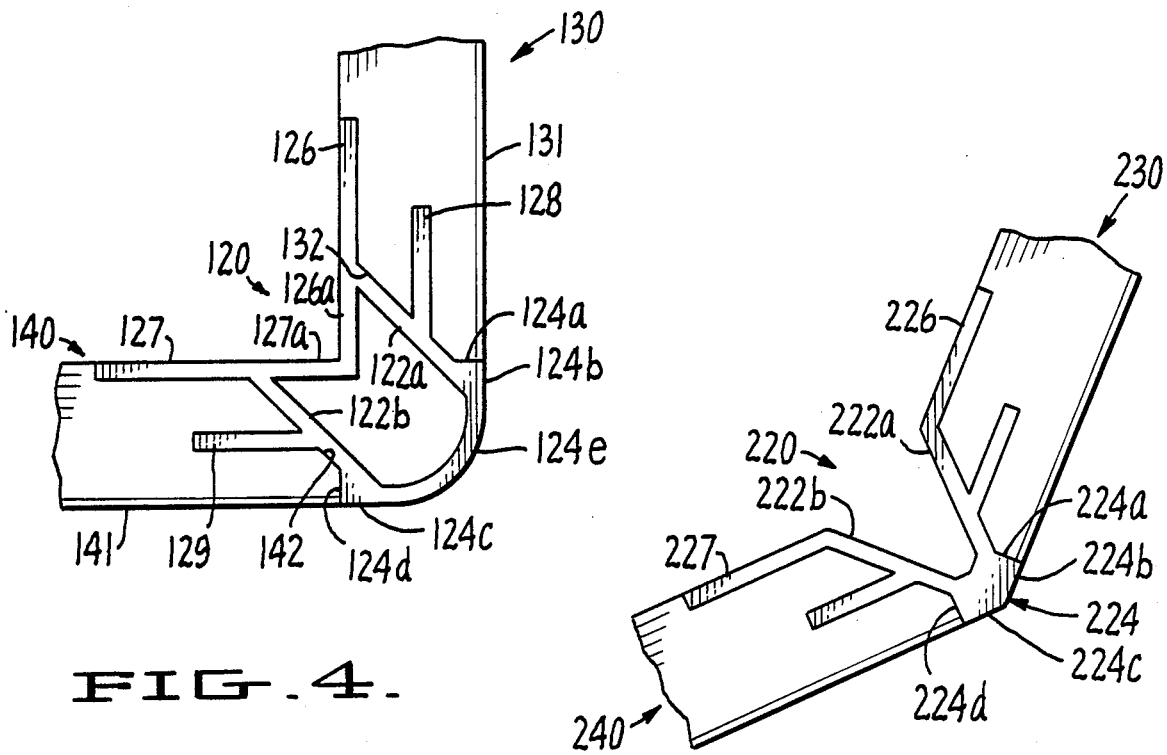
FIG.4.
FIG.5.
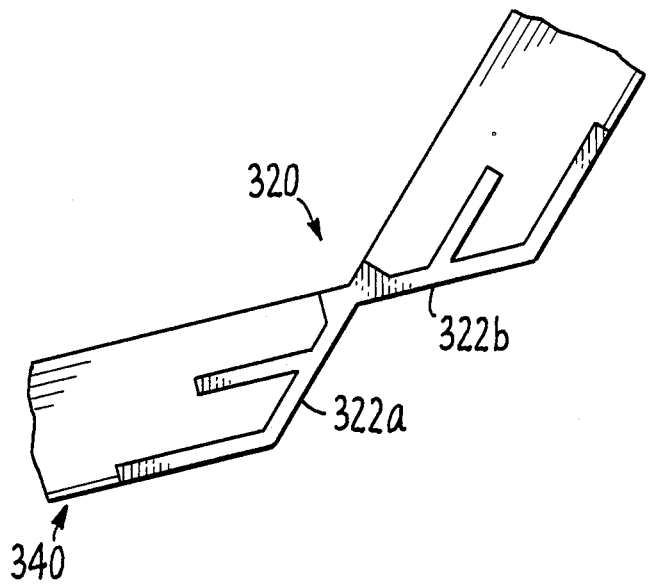
FIG.6.
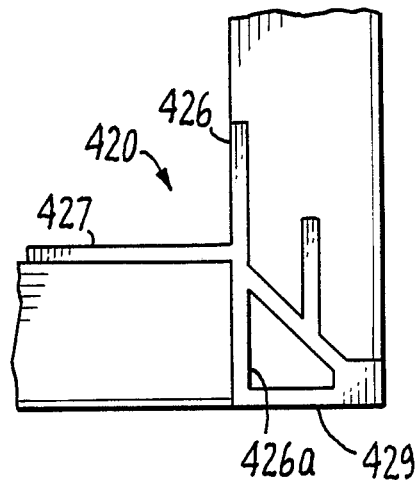
FIG.7.

CORNER CONSTRUCTION APPARATUS AND METHOD

This application is a continuation-in-part of application Ser. No. 800,468 filed Nov. 21, 1985 now abandoned.

The present invention relates in general to a corner construction apparatus and method and more particularly to a system of cabinet construction and assembly utilizing a family of corner extrusions and the modification of the facing ends of corner panels for mating with and joining with selected extrusions.

BACKGROUND OF THE INVENTION

There is a need for an inexpensive corner construction for cabinets and display cases which will provide a strong, yet attractive cabinet corner joint and which will enable mass production of cabinets including production of slightly modified cabinets iwth a family of corner extrusions. Such a joint is especially desirable for cabinets and fixtures exposed to heavy traffic and carts, such as in supermarkets and large department stores wherein the carts and other objects are apt to collide with the joint with enough force to severely damage the appearance of any corner not made of solid metal. Unsuccessful attempts to provide appropriate structures have included surrounding the cabinet in an iron casing.

Some prior corner constructions aimed at solving this need include U.S. Pat. No. 3,380,768 to P. Wolfensperger and U.S. Pat. No. 3,381,430 to M. Wiczer. These patents disclose a corner extrusion structure of complex construction. Other corner-joining constructions are disclosed in U.S. Pat. Nos. 2,072,386, 2,089,866, 3,465,487, 4,035,972 and 4,261,148.

SUMMARY OF INVENTION

Broadly stated the present invention, to be described in greater detail below, is directed to a corner construction and method having easy to fabricate and handle extrusions which mate with standard, easily prepared ends of corner panels which are easily, yet rigidly, secured together with a solid metal portion of the extrusion located at the external corner of the joint to protect the joint against impact from other objects. The extrusions of this invention which can be cut to length for joining corner panels of any appropriate length comprise surface sections defined in cross section by at least one elongate rib section, squared off corners positioned at one end of the rib section and with the squared off corners having a pair of remote exposed faces and a pair of side faces, a pair of external leg sections positioned at the other end of the rib section and a pair of internal leg sections parallel to the external leg sections and located along the rib section substantially midway between the squared off corners and the external leg sections.

The extrusion is joined at a corner to the facing end of a pair of side panels when the side panels are cut diagonally at substantially 45 degrees but provided with a squared off face portion adjacent the external surface of the side panel for mating with the side faces of the extrusion squared off corner and the facing ends of the side panels slotted parallel with the broad side panel surfaces for receiving the extrusion internal leg sections.

In accordance with one aspect of the present invention the internal leg sections are dimensioned such that a normal projection of each internal leg section onto the adjacent external leg section ends substantially midway along the length of the external leg section. This construction results in a strong panel configuration but one well adapted for providing simple connection between the extrusion and the side panel.

In accordance with another aspect of the present invention also incorporating the aforementioned one aspect of the present invention, the extrusion and side panels are secured together by screws passing through apertures in the external leg section beyond the end of the normal projection of the adjacent internal leg section.

In accordance with still another aspect of the present invention the internal leg sections of the extrusion are substantially half again as thick as the external leg sections. With this construction the cutters of the cutter head, which prepares the end of the side panel for mating with the extrusion, will have a long life.

In accordance with still another aspect of the present invention the inside broad surfaces of the facing side panels are recessed to receive the external leg sections and the attaching means within the confines of the broad side panel surfaces. In a cabinet formed with this corner construction shelves can be inserted inside the cabinet and extending to the corner of the cabinet without the necessity for recessing portions of the corner of the shelf to accommodate structure that forms the corner joint.

The corner construction in accordance with the present invention, results in a inexpensive and easily fabricated corner which has a solid metal corner section to withstand collisions from other objects and at the same time have an attractive appearance of a metal stripe down the corner, typically smoothly merging with the exterior surfaces of the side panels.

In accordance with one extrusion embodiment of this invention the squared off corners form a square external corner section with the diagonal of the square section aligned with the length of the rib section.

In accordance with another embodiment two parallel spaced apart rib sections are provided and the squared off corners connected by a continuous arcuate external surface section.

In accordance with another embodiment two rib sections are provided joined together at their ends adjacent the squared off corners and their other ends spaced so that the rib sections form an angled corner of an angle of ninety degrees plus the angle between the rib sections.

Another advantage of the present invention is that cabinets of many different shapes can be constructed out of panels which are cut and formed with a standard end shape and different extrusions used to complete the cabinet.

These features and advantages of the present invention will become more apparent from a perusal of the following specification taken in conjunction with the accompanying drawing wherein similar characters of references refer to similar structures in each of the several views.

DESCRIPTION OF THE DRAWINGS

FIGS. 4–6 are views similar to FIG. 2 but with exaggerated spacings between the side panels and the different shaped extrusions in each of the views.

DESCRIPTION OF THE PREFERRED EMBODIMENT

Figure 1:
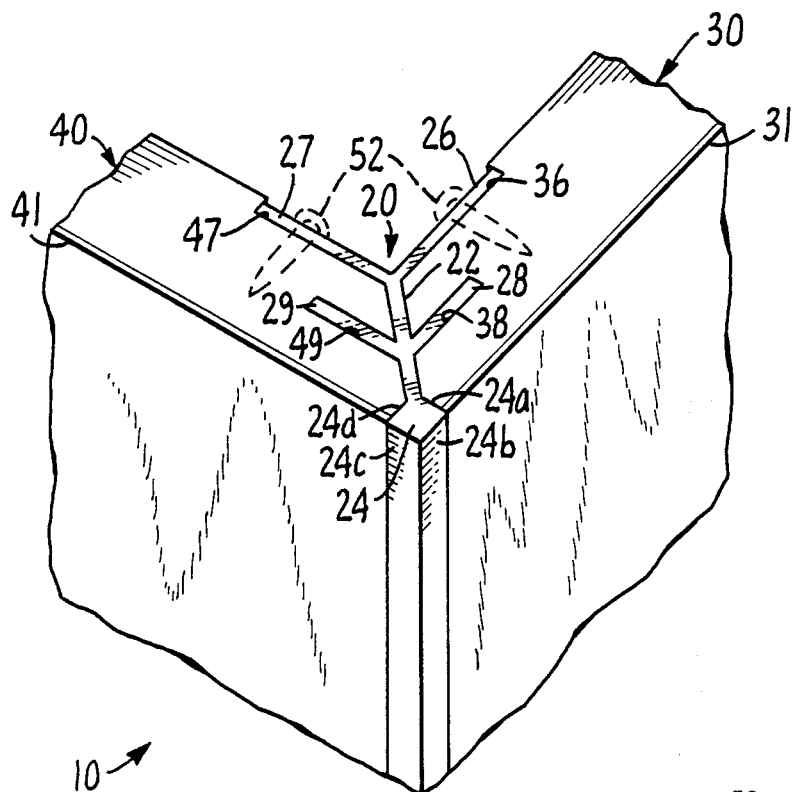
FIG. 1 is a elevational perspective view of the corner construction of the present invention.

Referring now to the drawing there is shown the construction of the corner extrusion and side panel facing ends formed in accordance with one embodiment of the present invention and providing a ninety degree corner construction which can be the vertical, the horizontal or other situated corner of a cabinet, rack, display case, display stand, fixture or the like.

The corner construction is made up of three principal elements, a metal corner extrusion 20, such as of aluminum, mating with and joining the ends of a pair of corner meeting side panels 30 and 40. The side panels 30 and 40 can be of any appropriate material such as wood, wood composition, or a combination of elements such as a pressed particle board faced with a hard exterior surface such as laminated plastic sheets 31 and 41. The sheets may be colored or textured as desired to provide a pleasing appearance.

The elongate corner extrusion 20 which has been cut to length to match the width of the side panels 30 and 40 has a plurality of surfaces which are described with reference to the cross-section of the extrusion 20 in the drawing. The extrusion is provided with an elongate rib section 22 which is connected at one end to squaded off corners or a square external corner section 24 having a pair of exposed faces 24b and 24c remote from the rib section 22 and a pair of side faces 24a and 24d adjacent the rib section 22 and mating with the side panels as described in greater detail below. The square section 22 is formed with a diagonal of the square aligned with the length of the rib section 22 so that the side faces 24a and 24d intersect the rib section 22 at an angle of substantially 135 degrees.

Mutually perpendicular external leg or fin sections 26 and 27 are positioned at the opposite end of the rib section 22 from the corner section 24 with the angle between the leg sections 26 and 27 bisected by the length of the rib section 22. The term "external" is used to mean a section that is not bounded on both sides by the side panel in the completed corner joint.

Mutually perpendicular internal leg or fin sections 28 and 29 are located on opposite sides of the rib section 22 substantially midway between the remote corner of the square corner section 24 and the external leg sections 26 and 27. The dimensions of the leg sections 26–29 are selected such that the normal projection of each internal leg section 28 and 29 on the respective adjacent leg section 26 and 27 ends substantially halfway along the length of the external leg section. The portion of the external leg sections 26 and 27 beyond the normal projection of the internal leg sections 28 and 29 are provided with apertures 50 for receiving fastening means, such as screws 52, passing therethrough into the side panel.

The facing ends of the side panels 30 and 40 are cut to mate with the extrusion 20 to form the corner joint with the extrusion square section 24 located at the diagonally outward external end of the joint and the external leg sections 26 amd 27 at the diagonally inward end of the joint. The ends of the side panels 30 and 40 which face the joint are cut at substantially 45 degrees to produce diagonal surfaces 32 and 42, respectively, for mating with the surfaces of the rib section 22 and leaving a squared off surface portion 34 and 44 for mating with the side faces 24a and 24d, respectively, of the corner section 24. With the width of the squared off portions 34 and 44 matching the width of side faces 24a and 24d the external surface of the side panels 30 and 40 will be flush with the exposed faces 24b and 24c respectively, of the corner section. Elongate slots 38 and 49 are cut in the side panels 30 and 40, respectively, parallel with the broad surfaces of the side panels for receiving the extrusion internal leg sections 28 and 29 respectively.

In the preferred embodiment of the present invention the inside surfaces of the side panels 30 and 40 are provided with recesses 36 and 47, respectively, adjacent the diagonal surfaces 32 and 42, respectively, for receiving the external leg sections 26 and 27, respectively. The depth of the recesses 36 and 47 is selected such that the external leg sections 26 and 27 and the attaching means, such as screws 52 when in place in the completed corner construction, are located within the confines of the broad side panel surfaces. With this construction the corner of any shelf that is placed inside the cabinet and reaching the corner joint 10 need not be notched to avoid the structure which joins the corner together.

The slots 38 and 49 are located substantially halfway between the broad outside and inside surfaces of the panels 30 and 40.

For the mass production of cabinets and specifically cabinet corners in accordance with the present invention, a cutting head can be provided to simultaneously make the diagonal, slotting and recess cuts to form the diagonal surfaces 32 and 42, the slots 38 and 49 and the recesses 36 and 47 at the end of each side panel. So that the cutter portion of the cutter head for making the slots 38 and 49 will last as long as the other cutters on the cutting head, the slots are made wider with the end result that the internal leg sections 28 and 29 are thicker, typically half again as thick, as the rib section 22 and external leg sections 26 and 27.

The dimensions of the corner section are selected to provide enough solid metal to avoid bending or defamation by impact with objects. The dimensions of the corner section 24 are also selected such that the inside faces 24a and 24d which may mate exactly with the squared off ends 34 and 44, respectively, of the side panels 30 and 40, do not leave a pointed structure on the end of the side panels 30 and 40 which could be damaged in the handling of the side panels before assembly of the corners.

FIGS. 4–7 illustrate other extrusion embodiments of the present invention. In these figures spacing is added between the extrusion and panel cross-sections to facilitate an appreciation of the different extrusion shapes that can be used with a common side pannel construction to form cabinets of different shapes.

In FIG. 4 the extrusion 120 includes a pair of parallel, spaced apart rib sections 122a and 122b and with the exposed faces 124b and 124c of the squared off corners connected by a continuous, arcuate, external surface section 124e which provides a rounded, structually strong external corner. The external leg or fin sections 126 and 127 continue beyond the rib sections 122a and 122b, respectively, at 126a and 127a and meet at a right angle.

In FIGS. 5 and 6 the extrusions 220 and 320, respectively, provide corners of 225 degrees and 135 degrees, respectively, measured between the external faces of the panels being joined. The extrusion embodiments in each of the figures includes a pair of rib sections 222a and 222b and 322a and 322b, respectively, and wherein the rib sections are joined at their ends adjacent the squared fof corners. The other ends of the rib sections are spaced apart to form an angled corner of the desired angle.

It will be seen that the cut and shape of the facing ends of the side panels in each of the embodiments in FIGS. 2, 4, 5 and 6 are identical. Thus, cabinets of different shapes can be formed from identical panels using the different extrusions.

Figure 2:
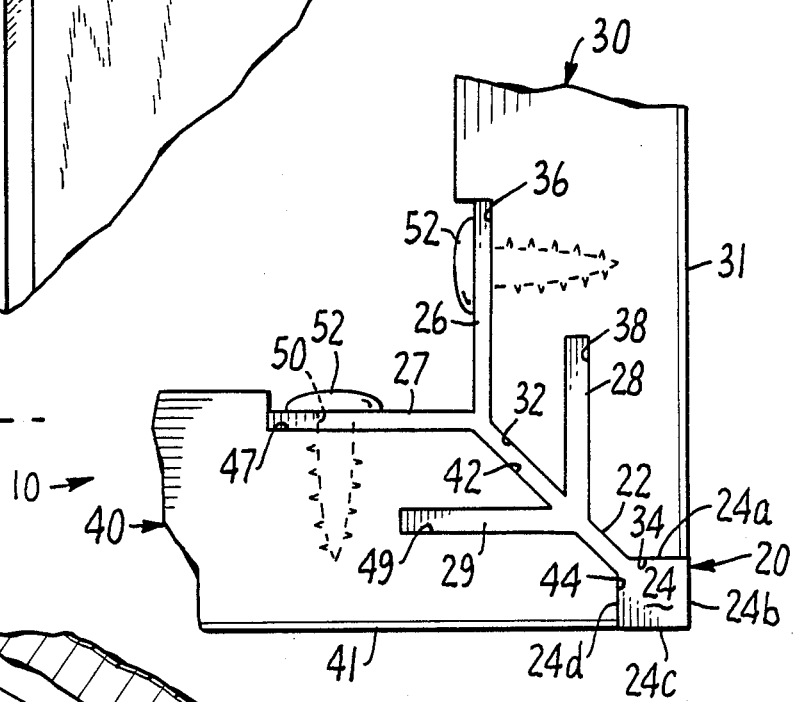
FIG. 2 is an enlarged plan view of the corner construction of the present invention.
Figure 3:
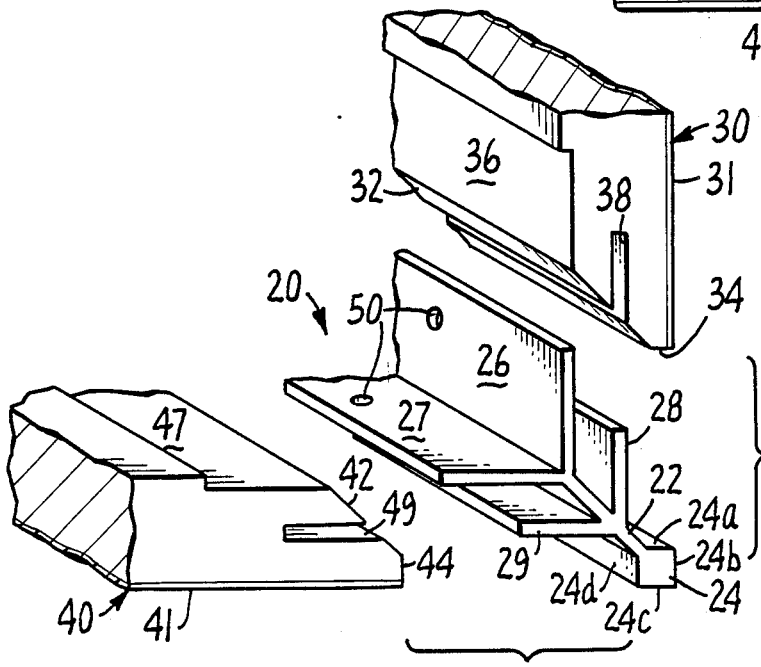
FIG. 3 is an exploded perspective view of the parts making up the corner construction of the present invention.

FIG. 7 illustrates an extrusion 420 similar to the one in FIG. 2 but for connecting the bottom edge of a panel 430 to a support plateform 441. The extrusion 420 includes enternal and internal leg sections 426 and 428 on one side of a rib section 422 and corner section 424 at the end on the other side of the rib section 422 a leg section 427 is provided perpendicular to leg section 426 and for resting on the platform 441. An extension 426a is provided in line with the leg 426 and perpendicular to the leg seation 427, and a bottom section 429 is provided perpendicular to the extension 426a and joining the corner section 424 at surface 424c.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. A cabinet corner constructed extrusion for mating with and joining a pair of side panels comprising a plurality of surface sections defined in cross-section by:
   an elongate rigid rib section,
   an external corner section positioned at one end of said rib section with a diagonal of said corner section aligned with the length of said rib section and having a pair of remote exposed faces and a pair of side faces,
   a pair of rigid external leg sections normal to one another and positioned at the other end of said rib section with the angle between said external leg sections bisected by the length of said rib section, and
   a pair of rigid internal leg sections normal to one another, each of said internal leg sections being parallel to one of said external leg sections and located along said rib section substantially mid-way between the remote corner of said corner section and said external leg sections, the lengths of said internal leg sections being such that a normal projection of each internal leg section onto the adjacent external leg section ends substantially halfway along the length of such external leg section.

2. The extrusion of claim 1 wherein said external corner section has a square cross-section.

3. The extrusion of claim 1 characterized further in that the external leg sections beyond the end of the normal projection of the adjacent internal leg sections have a plurality of apertures for passing screws for securing the extrusion together with the side panels.

4. The extrusion of claim 1 wherein said internal leg sections are substantially half again as thick as said external leg sections.

5. A cabinet corner construction extrusion for mating with and joining a pair of side panels comprising a plurality of surface sections defined in cross-section by:
   a pair of spaced apart rib sections,
   squared off corners positioned at one end of said rib sections and having a pair of remote exposed faces and a pair of side faces,
   said exposed faces of said squared off corners connected by a continuous arcuate external surface section,
   a pair of rigid external leg sections at the other end of said rib section continuing in between said rib sections to meet in a right angle, and
   a pair of rigid internal leg sections normal to one another, parallel to said external leg sections and located along said rib sections substantially midway between the squared off corners and said external leg sections.

6. A cabinet corner comprising:
   a pair of side panels having facing ends, an elongate rigid extrusion fitting said facing ends of said side panels, said extrusion having a plurality of surface sections defined in cross section by
   a rigid elongate rib section, a square external corner section positioned at one end of said rib section with a diagonal of said square section aligned with the length of said rib section and having a pair of remote exposed faces and a pair of at least partially covered side faces, a pair of rigid external leg sections normal to one another and positioned at the other end of said rib section with the angle between said external leg sections bisected by the length of said rib section, and a pair of rigid internal leg sections normal to one another, parallel to said external leg sections and located along said rib section substantially midway between the remote faces of said square section and said external leg sections, the facing ends of said side panels having diagonal faces mating with opposite faces of said extrusion rib section, squared off faces mating with and at least partially covering said side faces of said square section, and elongate slots substantially midway between the inside and outside broad surfaces of the side panels receiving said internal leg sections and means securing at least said external leg sections to the inside surfaces of said panels.

7. The cabinet corner of claim 6 wherein the inside broad surfaces adjacent said facing ends of said side panels are recessed to receive said external leg sections such that the external leg sections are located within the confines of the broad side panel surfaces.

8. The cabinet corner of claim 6 wherein a normal projection of each internal leg section onto the adjacent external leg section ends substantially half way along the length of such external leg section.

9. The cabinet corner of claim 8 wherein said securing means includes screws passing through the external leg sections beyond the end of the normal projection of the adjacent internal leg section.

10. The cabinet corner of claim 6 wherein said internal leg sections are substantially half again as thick as said external leg sections.

11. A cabinet corner comprising:
   a pair of side panels having facing ends,
   each side panel having a broad inside surface and a broad outside surface,
   each of said facing ends cut at substantially 45 degrees to form a diagonal surface except for squared off surface adjacent the outside surface of the panel, each of said facing ends having an elongate slot substantially midway between said inside and said outside broad surfaces of said panels, the inside broad surface at each of said facing ends of said side panels having a recess parallel with said elongate slot, an elongate rigid extrusion fitting said facing ends of said side panels, said extrusion having a plurality of surface sections defined in cross section by at least one rigid elongate rib section, squared off corners positioned at one end of said rib section and located at the squared off surfaces of said facing ends of said panels and having a pair of remote exposed faces and a pair of at least partially covered side faces, a pair of rigid external leg sections positioned at the other end of said rib section and located within the recess of the inside surfaces of said side panels, and a pair of rigid internal leg sections each parallel to one of said external leg sections and located along said rib section substantially midway between the squared off corners and said external leg sections, and means securing said side panels and said extusion together.

12. The cabinet corner of claim 11 wherein a normal projection of each internal leg section onto the adjacent external leg section ends substantially half way along the length of such external leg section.

13. The cabinet corner of claim 12 wherein said securing means includes screws passing through the external leg sections beyond the end of the normal projection of the adjacent internal leg section.

14. The cabinet corner of claim 11 wherein said internal leg sections are substantially half again as thick as said external leg sections.

15. The extrusion of claim 11 wherein said squared off corners form a square external corner.

16. A cabinet corner comprising:

a pair of side panels having facing ends, each side panel having a broad inside surface and a broad outside surface, each of said facing ends cut at substantially 45 degrees to form a diagonal surface except for a squared off surface adjacent the outside surface of the panel, each of said facing ends having an elongate slot substantially midway between said inside and said outside broad surfaces of said panels, the inside broad surface at each of said facing ends of said side panels having a recess parallel with said elongate slot, an elongate rigid extrusion fitting said facing ends of said side panels, said extrusion having a plurality of surface sections defined in cross section by a pair of spaced apart rib sections, squared off corners positioned at one end of said rib sections and located at the squared off surfaces of said facing ends of said panels and having a pair of remote exposed faces and a pair of at least partially covered side faces, said squared off corners connected by a continuous arcuate external surface section at one end of said rib sections, a pair of external leg sections at the other end of said rib sections continuing in between said rib sections to meet in a right angle, said external leg sections located within the recess of the inside surfaces of said side panels, and a pair of internal leg sections parallel to said external leg sections and located along said rib section substantially midway between the squared off corners and said external leg sections, and means securing said side panels and said extrusion together.

17. A cabinet corner construction extrusion for mating with and joining a pair of side panels comprising a plurality of surface sections defined in cross-section by:

a pair of rigid elongate rib sections, squared off corners positioned at one end of said rib sections and having a pair of remote exposed faces and a pair of side faces, one of said side faces intersecting with one of said rib sections and the other of said side sections intersecting the other of said rib sections, a pair rigid external leg sections positioned at the other end of said rib sections, and a pair of rigid internal leg sections located along said rib sections substantially mid-way between the squared off corners and said external leg sections, said external and said internal leg sections arranged in side pairs with each side pair including one internal and one external leg section and one side pair of leg sections connected to said one rib section and the other side pair connected to said other rib section, both leg sections of each side pair being parallel to one another and perpendicular to that side face intersecting the rib section to which said side pair of leg extensions is connected.

18. The cabinet corner construction extrusion of claim 17 wherein said rib sections are parallel and said exposed faces are connected together by a continuous arcuate external surface section.

19. The cabinet corner construction extrusion of claim 17 wherein said pair of rib sections are adjacent and joined at their ends adjacent said squared off corners and are spaced apart at their other ends to form an angled corner.

20. The cabinet corner construction extrusion of claim 19 wherein said exposed faces meet in an exterior angle of substantially 135 degrees.

21. The cabinet corner construction extrusion of claim 19 wherein said exposed faces meet in an exterior angle of substantially 225 degrees.

* * * * *

UNITED STATES PATENT AND TRADEMARK OFFICE
CERTIFICATE OF CORRECTION

PATENT NO. : 4,840,440

DATED : June 20, 1989

INVENTOR(S): Monrow Dieter

It is certified that error appears in the above - identified patent and that said Letters Patent is hereby corrected as shown below:   On the title page:

In the abstract line 17, correct the word "agains" to read "again"

In Col. 5, line 3, correct the word "fof" to read "off"

In Col. 7, line 26, correct the word "extusion" to read "extrusion"

In Col. 8, line 29, correct the words "a pair rigid..." to read "a pair of rigid...."

Signed and Sealed this

Seventeenth Day of July, 1990

Attest:

HARRY F. MANBECK, JR.

Attesting Officer

Commissioner of Patents and Trademarks